Patented Dec. 26, 1950

2,535,982

UNITED STATES PATENT OFFICE 2,535,982

AZA TRINUCLEAR CYANINE DYES

Henry G. Derbyshire, Johnson City, N. Y., assignor to General Aniline & Film Corporation, New York, N. Y., a corporation of Delaware No Drawing. Application December 16, 1949, Serial No. 133,474

4 Claims. (Cl. 260—240.1)

This invention relates to trinuclear cyanine dyes of the rhodacarbocyanine type containing an aza (=N—) group in the chromophoric chain, and particularly to an improved method of preparing the same.

Trinuclear cyanine dyes of the rhodacarbocyanine type containing an aza group in the chromophoric chain have been prepared by the method described in United States Patent 2,388,963. The method consists of first quaternizing a cyclammonium base, containing a reactive thiol group, and condensing it with an N-ethylrhodanic acid to obtain the merocyanine intermediate. This procedure involves two steps and requires about 4 hours' time. The merocyanine intermediate is then fused with a mixture of an amino-substituted cyclammonium base and a quaternizing agent, such as methyl p-toluenesulfonate for 2½ to 3½ hours. After cooling the melt, pyridine is added and the mixture reheated, under reflux, for 20 to 30 minutes. The reactive mixture is then poured into an aqueous solution of potassium bromide and the final dye obtained by recrystallization from alcohol. The minimum time required for the latter two steps is approximately from 3 to 4 hours, exclusive of the time required to cool the reaction mixture. The process steps involved in this preparation are not only tedious, but time consuming.

It is an object of the present invention to provide an improved and simplified method for the preparation of trinuclear cyanine dyes containing an aza group in the chromophoric chain.

A further object of the present invention is to provide a method of producing rhodacarbocyanine dyes, containing an aza group in the chromophoric chain, without first forming the usual merocyanine dye intermediates.

A still further object is to provide a simple method of obtaining, in excellent yield, trinuclear cyanine dyes containing an aza group in the chromophoric chain.

Other objects and advantages will become apparent from the following description.

I have found that trinuclear cyanine dyes, containing an aza group in the chromophoric chain, are prepared in excellent yield and in readily purifiable form by treating a cyclammonium quaternary salt, containing a particular reactive group, of the type commonly employed in cyanine dye syntheses with an azathiazolone cyanine dye in a suitable solvent, such as an aliphatic alcohol, e. g., methyl, ethyl, n-propyl, isopropyl, and the like, in the presence of a basic condensing agent, such as sodium methylate, trimethylamine, triethylamine, pyridine, methylpyridine, ethylpyridine, quinoline, potassium carbonate, and the like, at room temperature for about 1 hour or by simply heating the reaction mixture for a matter of minutes, either by boiling or at reflux.

The dyes obtained by the foregoing procedure are characterized by the following general formula:

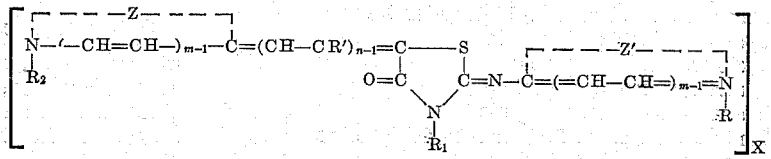

wherein $m$ represents 1 or 2, $n$ represents a positive integer of from 1 to 3, R and $R_2$ are the same or different and represent alkyl, aryl, or aralkyl or substituted groups of this type, e. g., methyl, ethyl, propyl, isopropyl, n-butyl, isobutyl, n-amyl, isoamyl, hydroxyethyl, γ-hydroxlpropyl, β-methoxyethyl, β-ethoxyethyl, allyl, phenyl, p-tolyl, o-tolyl, α-naphthyl, β-naphthyl, benzyl, menaphthyl, β-phenylethyl, β-carboxyethyl, carboxymethyl, α-carboxyethyl, γ-carboxypropyl, β-acetoxyethyl, γ-acetopropyl, carbomethoxymethyl, β-carbomethoxymethyl, β-carboethoxymethyl, naphthylmethyl, and the like, $R_1$ represents an allyl or an alkyl, aryl or aralkyl group of the same value as R, R' represents either hydrogen or a lower alkyl group, e. g., methyl, ethyl, propyl, etc., and lower alkyl only when $n$ is 2, X represents an acid radical, e. g., chloride, bromide, iodide, perchlorate, and the like, Z and Z' are the same or different and represent the residues of heterocyclic nitrogenous nuclei of the type common in cyanine dyes, e. g., oxazoles, thiazoles, selenazoles, and their polycyclic homologues, such as those of the benzene, naphthalene, acenaphthene and anthracene series, pyridine, and its polycyclic homologues, such as quinoline and α- and β-naphthaquinolines, indolenines, benzimidazoles, diazines, such as pyrimidines and quinazolines, thiazolines and selenazolines. The polycyclic compounds of this series may also be substituted in the carbocyclic rings with one or more groups, such as alkyl, i. e., methyl, ethyl, etc., aryl, i. e., phenyl or amino, hydroxy, alkoxy, i. e., methoxy, ethoxy, etc., and methylene-dioxy groups, or by halogen, i. e., chlorine, bromine or iodine atoms.

As illustrative examples of nitrogenous heterocyclic nuclei of the class common in cyanine dyes, the following may be mentioned:

Thiazoles, e. g., 4-methylthiazole
4-phenylthiazole
4,5-dimethylthiazole
4,5-diphenylthiazole
5-methylthiazole
5-phenylthiazole
4-(2-thienyl)thiazole, and the like,
Benzthiazole, e. g., benzothiazole
4-chlorobenzothiazole
5-chlorobenzothiazole
6-chlorobenzothiazole
7-chlorobenzothiazole
4-methylbenzothiazole
5-methylbenzothiazole
6-methylbenzothiazole
4-methoxybenzothiazole
5-methoxybenzothiazole
6-methoxybenzothiazole
5-bromothiazole
6-bromothiazole
5-iodobenzothiazole
6-iodobenzothiazole
4-phenylbenzothiazole
5-phenylbenzothiazole
4-ethoxybenzothiazole
5-ethoxybenzothiazole
Tetrahydrobenzothiazole
5,6-methoxybenzothiazole
α-Naphthiazoles
β-Naphthiazoles
Benzoselenazoles, e. g., benzoselenazole
5-methoxybenzoselenazole
5-chlorobenzoselenazole
5-methylbenzoselenazole
Tetrahydrobenzoselenazole,
Thiazolines, e. g., 3,3'-dimethylthiazoline
Quinoline, e. g., quinoline,
6-methylquinoline
7-methylquinoline
8-methylquinoline
6-chloroquinoline
8-chloroquinoline
5,6-benzoquinoline, and the like.

The dyes are obtained by heating an azathiazolone cyanine dye with any cyclammonium quaternary salt of the type commonly employed in cyanine dye synthesis containing from 5 to 6 atoms in the heterocyclic ring and containing a reactive group in either alpha-, beta-, or delta-position of the side chain in 2-position of the nitrogen atom thereof, at room temperature for about an hour, or by heating the reaction mixture for a matter of minutes in the presence of a basic condensing agent, such as sodium methylate, trimethylamine, triethylamine, pyridine, methylpyridine, ethylpyridine, quinoline, and the like.

The azathiazolone cyanine dyes, utilized as coreactants with the foregoing cyclammonium quaternary salts are prepared according to the method described in my application Serial No. 133,473, filed on even date. In general, the method involves condensing an appropriately substituted heterocyclic thiourea with an α-halogen acetic acid. The condensation reaction between the substituted thiourea and α-halogen acetic acid is carried out, as pointed out above, by simply heating the coreactants at a temperature ranging from 100–150° C. for 3 to 6 hours.

The reaction can also be effected by heating the coreactants in the presence of an alcohol or glacial acetic acid for a few minutes at reflux or on a steam bath. I prefer for the sake of expediency to operate by heating the coreactants in the presence of butyl, amyl, or isobutyl alcohol and the like or in the presence of glacial acetic acid at a temperature ranging from 75–150° C. for a period of time ranging from 5 minutes to 1 hour.

The reaction involved in this case by utilizing, for example, chloracetic acid is believed to take place as follows:

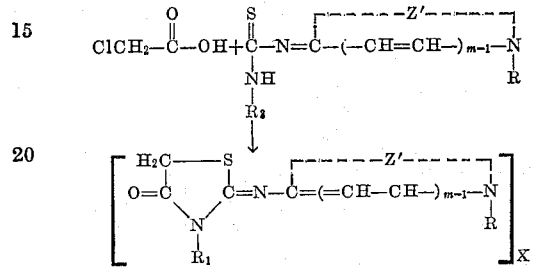

wherein $m$, $R$, $R_1$, $X$ and $Z'$ have the same values as above, and $R_3$ represents an alkyl, allyl, aryl, or aralkyl group of the same value as in $R_1$.

The cyclammonium quaternary salts of the type commonly employed in cyanine dye synthesis containing a reactive group referred to above and heated with the azathiazolone cyanine dye are characterized by the following general formula:

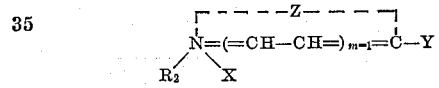

wherein $m$, $R_2$, $X$ and $Z$ have the same values as above, and $Y$ represents a reactive group in a reactive position, i. e., from alpha- to delta-position of the side chain in 2-position of the nitrogen atom of said cyclammonium quaternary salt, such as, for example:

Alkylmercapto, e. g., methylmercapto
Ethylmercapto
Propylmercapto
Butylmercapto
Arylmercapto, e. g., phenylmercapto
Tolylmercapto
Naphthylmercapto, etc.
β-Alkylmercaptovinyl, e. g., β-methylmercaptovinyl
β-Ethylmercaptovinyl
β-Propylmercaptovinyl
β-Butylmercaptovinyl
β-Arylmercaptovinyl, e. g., β-phenylmercaptovinyl
β-Tolylmercaptovinyl
β-Naphthylmercaptovinyl
β-Alkylmercapto-β-alkylvinyl, or
β-Alkylmercapto-β-arylvinyl, e. g., β-methylmercapto-β-methylvinyl
β-Methylmercapto-β-ethylvinyl
β-Methylmercapto-β-propylvinyl
β-Methylmercapto-β-butylvinyl
β-Ethylmercapto-β-methylvinyl
β-Ethylmercapto-β-ethylvinyl
β-Ethylmercapto-β-butylvinyl
β-Butylmercapto-β-ethylvinyl
β-Butylmercapto-β-propylvinyl
β-Butylmercapto-β-butylvinyl
β-Ethylmercapto-β-phenylvinyl, and the like,
β-Aminovinyl and polyvinyl compounds, e. g.,
β-anilinovinyl β-Acetanilidovinyl
β-Piperidinovinyl
β-Morpholinovinyl
4-acetanilido-1,3-butadienyl
4-anilino-1,3-butadienyl
4-piperidine-1,3-butadienyl
4-morpholine-1,3-butadienyl
6-acetanilido-1,3,5-hexatrienyl
6-anilino-1,3,5-hexatrienyl
6-piperidino-1,3,5-hexatrienyl
6-morpholino-1,3,5-hexatrienyl These β-arylaminovinyl compounds are known for the most part and can be prepared by fusing a diarylformamidine with a cyclammonium quaternary salt containing a reactive methyl group. The acylarylaminovinyl compounds are formed by heating the diarylformamidine with the cyclammonium quaternary salt in a carboxylic anhydride, e. g., acetic, propionic, or butyric anhydride.

As typical examples of cyclammonium quaternary salts useful in the condensation of the azathiazolone cyanine dye, the following may be mentioned:

2-methyl-mercaptobenzothiazole ethiodide
2-phenylmercaptobenzothiazole ethiodide
2-(β-acetanilidovinyl)benzoxazole ethiodide
2-(β-acetanilidovinyl)benzothiazole
2-(β-acetanilidovinyl)quinoline ethiodide
4-(β-acetanilidovinyl)quinoline n-butiodide
2-(β-acetanilidovinyl)-β - naphthothiazole ethiodide
2-anilinovinylthiazoline methiodide
2-(β-acetanilidovinyl)benzothiazole pheniodide
2-(β-acetanilidovinyl)benzoselenazole ethiodide
2-(β-acetanilidovinyl) - 4 - phenylthiazole ethiodide
2-(β-acetanilidovinyl)-3,3' - dimethylindolenine methiodide
2-(β-[N-methylanilino]vinyl-benzothiazole ethiodide
2-(β-acetanilido)-3,4 - trimethylenebenzothiazolium iodide
2-(β-anilinovinyl) - 3 - phenylthiazolinium perchlorate
2-(β-anilinovinyl)-3 - (α-naphthyl)thiazolinium perchlorate, etc
2-(β-ethyl-β-methylmercaptovinyl)benzothiazole ethiodide
2-(β-acetanilidovinyl)benzoxazole methiodide
2-(4-acetanilide-1,3 - butadienyl)benzothiazole ethiodide
2-(6-anilino - 1,3,5 - hexatrienyl)benzothiazole ethiodide, and the like.

The following examples are illustrative of the method used in preparing the azathiazolone cyanine dyes.

*Example I*

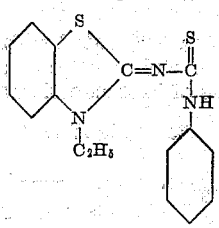

N-(3-ethyl-2-benzothiazolylidene)-N'-phenylthiourea 5.5 grams of 2-aminobenzothiazole ethiodide and 5 grams of phenyl isothiocyanate were dissolved in 10 mls. of hot pyridine. The solution was heated slowly until its temperature reached 130° C. Upon cooling to 25° C., a yellow solid crystalized which was filtered off, washed with water, dried, and purified by recrystallization from methanol. The product was dried at 85° C. The yield was 5.4 grams melting at 158° C.

*Example II*

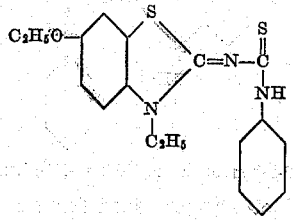

N-(3-ethyl-6-ethoxy-2-benzothiazolylidene)-N'-phenylthiourea 8 grams of 2-amino-6-ethoxybenzothiazole ethiodide and 5 grams of phenyl isothiocyanate were dissolved in 10 mls. of boiling pyridine. The resulting solution was stirred and slowly heated to 150° C. while permitting the pyridine to distill off at this point. Heating was discontinued, but stirring was kept up until the reaction mass cooled to 25° C. A yellowish solid separated which was washed with two 25 ml. portions of water, then triturated with 20 mls. of methanol and filtered. After consecutive washings with water and methanol, the solid was dried overnight at 80° C. 6 grams of a purified product were obtained which melted at 177-180° C.

*Example III*

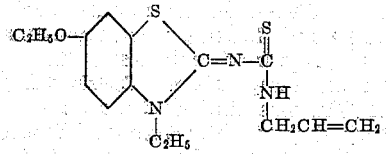

N-(3-ethyl-6-ethoxy-2-benzothiazolylidene)-N'-allylthiourea 7 grams of 2-amino-6-ethoxybenzothiazole ethiodide and 5 grams of allyl isothiocyanate were heated together in 5 mls. of boiling pyridine. Heating was continued until the internal temperature reached 150° C. The reaction mixture was cooled to room temperature and poured into 10 mls. of water. The yellow solid which separated was triturated with three fresh 10 ml. portions of methanol, filtered, washed alternately with water and methanol, and dried. The product melted at 119-122° C.

*Example IV*

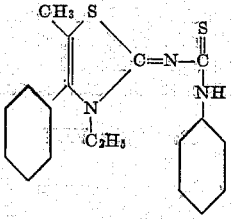

N-(3-ethyl-5-methyl-4-phenyl-2-thiazolylidene)-N'-phenylthiourea 6 grams of 2-amino-5-methyl-4-phenyl-2-thiazole ethiodide and 4 grams of phenyl isothiocyanate were dissolved in 10 mls. of hot pyridine. The resulting solution was heated until its internal temperature reached 140° C. The mixture was stirred slowly until cooled to 25° C. A solid separated which was diluted with 10 mls. of isopropyl alcohol, filtered, repeatedly washed with isopropyl alcohol and dried. 4.7 grams of a lemon-white solid was obtained which melted at 183–185° C.

Example V

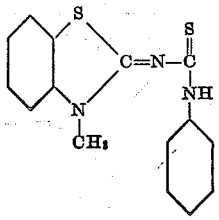

N-(3-methyl-2-benzothiazolylidene)-N'-phenylthiourea

This product was prepared from 5 grams of 2-amino-benzothiazole methiodide and 5 grams of phenylisothiocyanate by following the general procedure of Example I.

Example VI

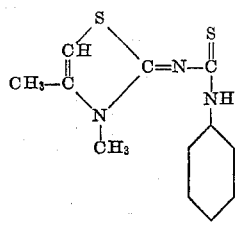

N-(3,4-dimethyl-2-thiazolylidene)-N'-phenylthiourea 100 grams of 2-amino-4-methylthiazole dimethylsulfate and 5.7 grams of phenyl isothiocyanate were heated slowly together until the temperature of the reaction mixture reached 140° C. At this point, heating was discontinued and the mass was stirred constantly until it had reached room temperature. Crystals separated when the mass was diluted with a mixture of 200 mls. of equal parts of water and isopropanol. The crystals were filtered off, washed in isopropyl alcohol, and dried.

Example VII

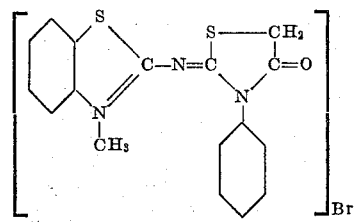

One gram of the product of Example V and 1 gram of bromoacetic acid were dissolved in 5 mls. of glacial acetic acid and heated for 5 minutes. The solution was cooled to room temperature, diluted with 10 mls. of ether, and stirred vigorously until a yellow fluffy solid separated. The crystals were filtered off, and repeatedly washed with ether.

Example VIII

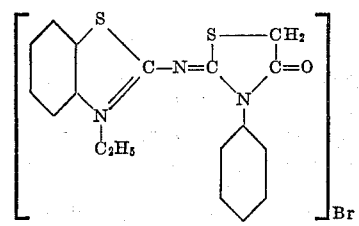

5.4 grams of the compound of Example I and 5 grams of bromoacetic acid were boiled together in 20 mls. of glacial acetic acid for 5 minutes. The cooled solution was poured into 40 mls. of ether.

A yellow crystalline solid precipitated which was washed with ether.

Example IX

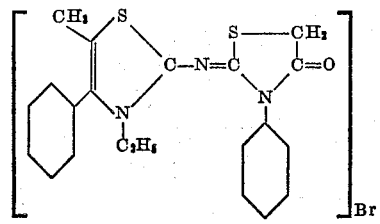

5 grams of the product of Example IV and 3 grams of bromoacetic acid were heated together for 30 minutes in boiling n-butanol. The mixture was cooled in ice and stirred until muddy-yellow crystals separated. After 10 mls. of isopropanol had been added, the crystals were filtered off, and washed with ether.

Example X

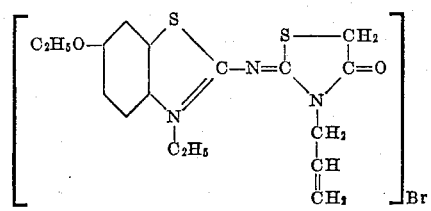

This product was obtained in the form of a fine yellow solid prepared from 2 grams of the compound of Example III and 2.2 grams of bromoacetic acid by following the procedure of Example VI.

Example XI

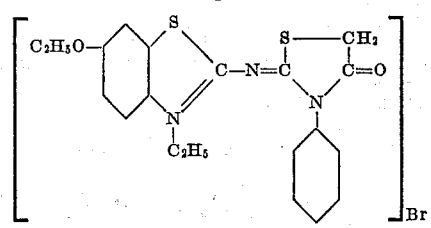

This product was obtained by a process analogous to the one described in Example VII but using 3.8 grams of the compound of Example II and 4 grams of bromoacetic acid as starting materials.

Example XII

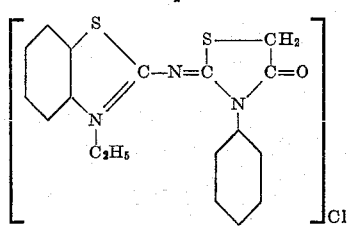

Example VIII was repeated with the exception that 3.4 grams of chloroacetic acid were used in place of 5 grams of bromoacetic acid.

Example XIII

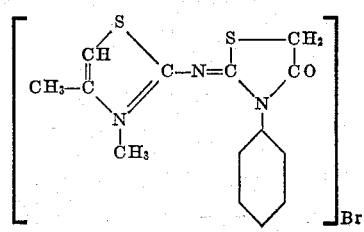

One gram of the compound of Example VI and 1 gram of bromoacetic acid were heated together for 2 minutes in the presence of 10 mls. of glacial acetic acid. The pale yellow solution was cooled to room temperature, diluted with 30 mls. of ether, decanted and triturated with an additional 30 mls. of anhydrous ether. A gummy solid was obtained which was used directly in dye synthesis.

The foregoing thiazolone cyanine dye salts may be converted to salts other than halogen by treating an alcohol solution of the halogen salt with an aqueous or aqueous-alcohol solution containing a sodium or potassium salt of perchloric, hydroiodic, or thiocyanic acid.

The following examples describe in detail the method of preparing the trinuclear dyes of the present invention, but it is to be understood that they are given merely for the purpose of illustration and are not to be construed as limitative.

Example XIV

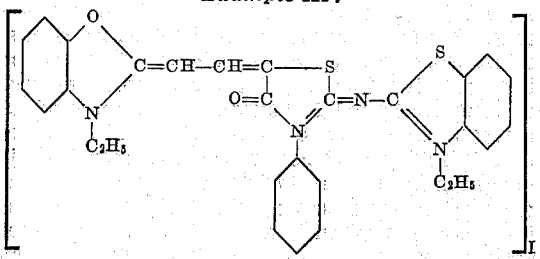

Two grams of 2-(β-acetanilidovinyl)benzoxazole ethiodide and 0.75 gram of the product of Example VIII were dissolved in 50 mls. of methanol. After the addition of 25 drops of triethylamine, the solution was heated and kept refluxing for 15 minutes. When the solution was cooled to room temperature, purple crystals separated which were washed with ethanol and ether and recrystallized from 50 mls. of methanol. Blue crystals melting above 250° C. were obtained. A solution in ethanol showed a blue appearance with an absorption maximum at 534 m$\mu$. A dye sensitized photographic chlorobromide emulsion to 620 m$\mu$ with a sensitization maximum at 580 m$\mu$.

Example XV

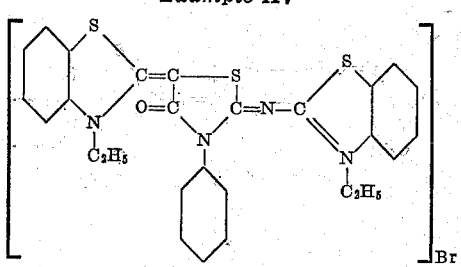

0.7 gram of the compound of Example VIII and 0.8 gram of 2-ethylmercaptobenzothiazole ethyl p-toluenesulfonate were dissolved in 10 mls. of warm methanol. 25 drops of triethylamine were added and the mixture brought to boiling. Upon cooling an orange-yellow solid separated, which was filtered and washed with isopropanol. The dye was purified by crystallization from 25 mls. of methanol. It melted with decomposition at 263° C.

The methanol solution of the dye showed an absorption maximum at 461 m$\mu$ and sensitized a silver chlorobromide emulsion to 540 m$\mu$ with a maximum at 480 m$\mu$.

Example XVI

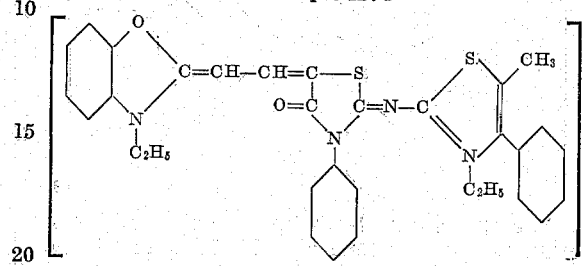

2 grams of 2-(β-acetanilidovinyl)benzoxazole ethiodide and 0.8 gram of the compound of Example IX were heated together in 50 mls. of methanol containing 25 drops of triethylamine. The crystals, which separated upon cooling and stirring, were filtered off, washed with methanol and dry ether, and recrystallized from methanol. The purified product has a melting point of 192-194° C. A methanol solution showed an absorption maximum at 521 m$\mu$ and extended the range of sensitization of a silver bromoiodide emulsion to 605 m$\mu$.

Example XVII

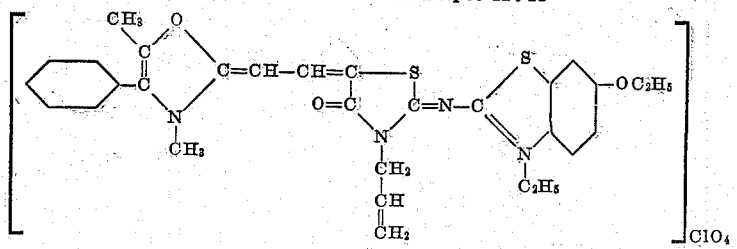

1.4 grams of the product of Example X and 1 gram of 2-(β-acetanilidovinyl)-5-methyl-4-phenyloxazole methiodide were dissolved in 20 mls. of boiling methanol. 30 drops of triethylamine were added and boiling continued for 1 minute. After cooling, 10 mls. of an aqueous 40% by weight solution of sodium perchlorate were added. The precipitate obtained was purified by crystallization from methanol and has a melting point of 184° C. A methanol solution showed an absorption maximum at 535 m$\mu$ and extended the sensitization range of a silver chlorobromide emulsion to 650 m$\mu$.

Example XVIII

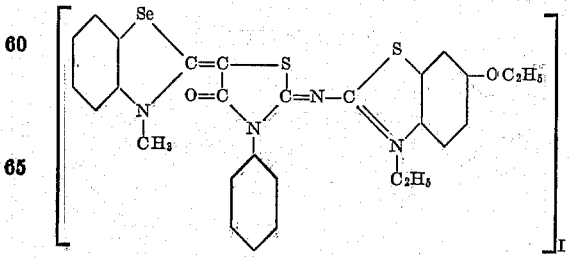

1.5 grams of 2-methylmercaptobenzoselenazole methiodide and 0.75 gram of the compound of Example XI were dissolved in 10 mls. of methanol and heated to boiling. An orange-red solid began to form immediately when 15 drops of triethylamine were added to the solution. After cooling and filtering, the solid was washed with water and recrystallized from methanol. It melted at 195° C. A solution in methanol showed an absorption maximum at 469 mμ and extended the sensitization range of a silver chlorobromide emulsion to 560 mμ.

*Example XIX*

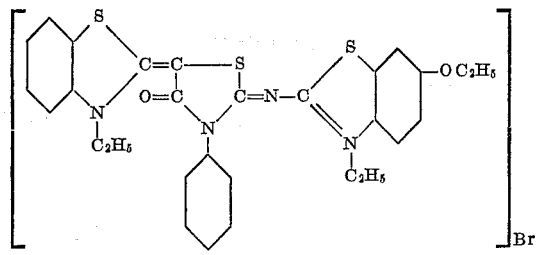

One gram of 2-ethylmercaptobenzothiazole ethyl p-toluenesulfonate and 1.5 grams of the compound of Example XI were dissolved in 10 mls. of boiling methanol. Twenty mls. of triethylamine were added and the precipitated mass agitated until cooled to room temperature. The yellow solid was filtered off, washed several times with water, and twice recrystallized from methanol. The crystals obtained melted at 330–335° C. A methanol solution showed an absorption maximum at 467 mμ and extended the sensitization range of a silver chlorobromide emulsion to 550 mμ.

*Example XX*

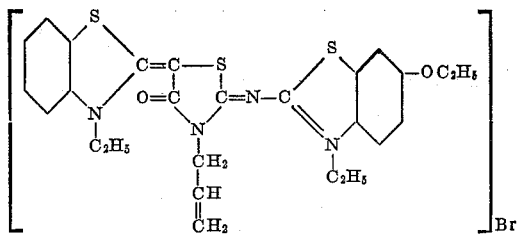

0.5 gram of the product of Example X and 1 gram of 2-ethylmercaptobenzothiazole ethyl p-toluenesulfonate were dissolved in 30 mls. of methanol. A precipitate began to form when 30 drops of triethylamine were added to the solution, and the mixture soon became a thick paste. The suspension was diluted with 20 mls. of methanol and filtered. The crystals were washed with a 1:1 mixture by volume of methanol and water, and twice recrystallized from methanol. The crystals obtained melted at 234–235° C. A methanol solution showed an absorption maximum at 460 mμ and extended the sensitization range of a silver chlorobromide emulsion to 540 mμ.

*Example XXI*

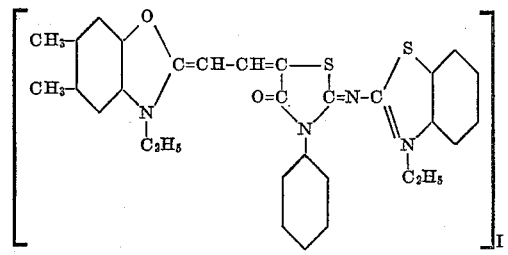

1.5 grams of the product of Example VIII and 1.5 grams of 2-(β-acetanilidovinyl)-5,6-dimethyl-benzoxazole ethiodide were dissolved in 20 mls. of methanol by gentle boiling. One ml. of triethyl- amine was added and the mixture stirred for 5 minutes. A dye separated which was filtered off, washed with water and after drying, twice recrystallized from methanol. The purified product melted at 238–240° C. Its methanol solution showed an absorption maximum at 543 mμ and extended the sensitization range of a silver chlorobromide emulsion to 630 mμ.

*Example XXII*

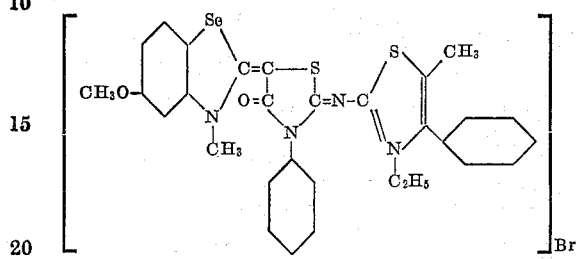

0.5 gram of the product of Example IX and 1 gram of 2-methylmercapto-5-methoxybenzo-selenazole methosulfate were dissolved in 20 mls. of isopropanol, by gentle boiling. One ml. of triethylamine was added after 25 minutes and heating continued for another 5 minutes while methylmercaptan was given off. When the mixture was allowed to cool to room temperature, it yielded fine orange crystals which were filtered off, washed with isopropanol, and recrystallized twice from methanol, and dried. A methanol solution showed an absorption maximum at 460 mμ and extended the sensitization range of a silver chlorobromide emulsion to 550 mμ.

*Example XXIII*

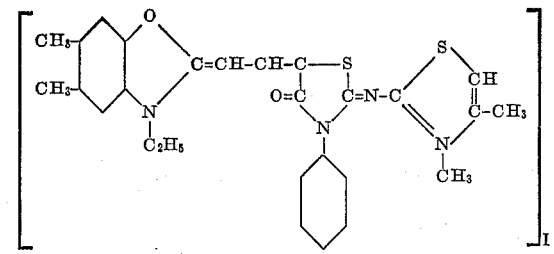

This product was prepared from 0.5 gram of the solid of Example XIII and 1.5 grams of 2-(β-acetanilidovinyl)-5,6-dimethylbenzoxazole ethiodide following the procedure of Example XIV. The product obtained melted at 260–267° C. with decomposition. A methanol solution showed an absorption maximum at 524 mμ and extended the sensitization range of a silver chlorobromide emulsion to 630 mμ.

*Example XXIV*

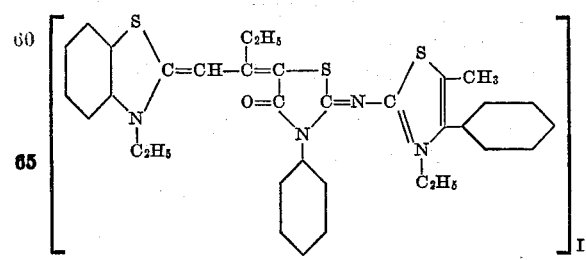

0.5 gram of the intermediate of Example IV and 1 gram of bromacetic acid were boiled for two minutes in 5 mls. of glacial acetic acid. After cooling to 30° C., 8 volumes of ethyl ether were added and the azathiazolone cyanine, which precipitated, filtered off, washed with ether, and immediately dissolved in 5 mls. of isopropanol. One gram of 2(β-ethyl-β-methylmercaptovinyl)-benzothiazole ethiodide was added and the solution brought to boiling. To the hot solution, 2 mls. of triethylamine were added and heating continued for 5 minutes. The mixture was allowed to cool; the dye crystals which formed were removed by filtration and purified by crystallization from 25 mls. of methanol. The green dye crystals melted at 261–263° C., and their solution in methanol showed an absorption maximum at 559 mμ.

While I have disclosed the preferred embodiments of my invention and the preferred modes of carrying the same into effect, it will be readily apparent to those skilled in the art that many variations may be made therein, without departing from the spirit thereof. Accordingly, the scope of my invention is to be limited solely by the appended claims.

I claim:

1. A process for the production of trinuclear cyanine dyestuffs comprising treating an azathiazolone of the general formula:

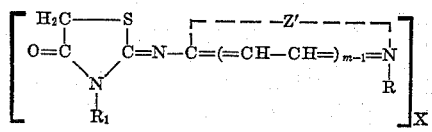

with a cyclammonium quarternary salt of the general formula:

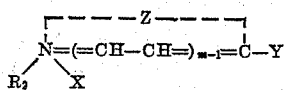

wherein Z and Z' are selected from the group consisting of residues of heterocyclic nitrogenous compounds of the type usual in the preparation of cyanine dyes, m represents an integer of from 1 to 2, R and R₂ are each selected from the group consisting of alkyl, hydroxyalkyl, alkoxyalkyl, aryl and aralkyl groups, R₁ is selected from the group consisting of alkyl, allyl, aryl and aralkyl groups, X represents an acid radical and Y represents an active group selected from the class consisting of alkylmercapto, arylmercapto, β-alkylmercapto, β-arylmercaptovinyl, β-alkylmercapto-β-alkylvinyl, β-alkylmercapto-β-arylvinyl, β-anilinovinyl, β-acetanilidovinyl, β-piperidinovinyl, β-morpholinovinyl, 4-acetanilido-1,3-butadienyl, 4-anilino-1,3-butadienyl, 4-piperidine-1,-3-butadienyl, 4-morpholine-1,3-butadienyl, 6-acetanilido-1,3,5-hexatrienyl, 6-anilino-1,3,5-hexatrienyl, 6-piperidine-1,3,5-hexatrienyl, and 6-morpholino-1,3,5-hexatrienyl.

2. A process for the production of a trinuclear dyestuff characterized by the following formula:

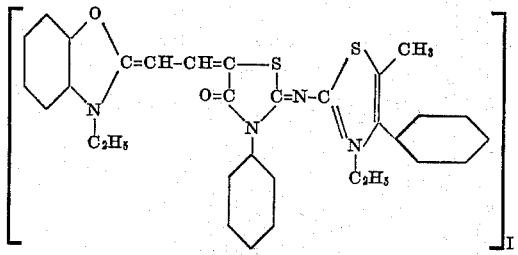

which comprises treating a thiazolone of the following formula:

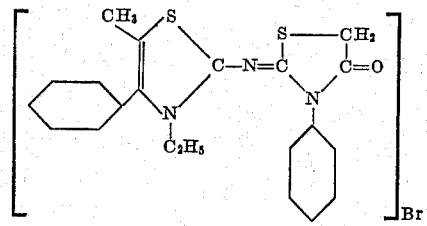

with 2-(β-acetanilidovinyl)benzoxazole ethiodide in the presence of an aliphatic alcohol and a basic condensing agent.

3. A process for the production of a trinuclear dyestuff characterized by the following formula:

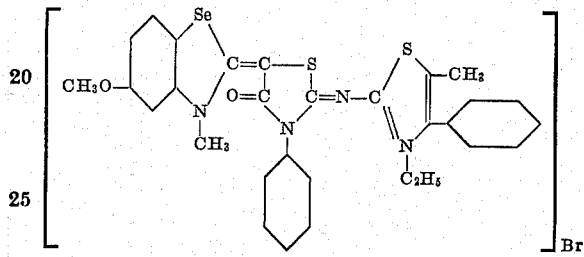

which comprises treating a thiazolone of the following formula:

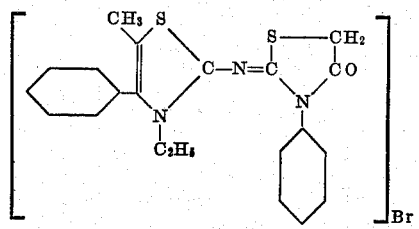

with 2-methylmercapto-5-methoxybenzoselenazole methosulfate in the presence of an aliphatic alcohol and a basic condensing agent.

4. A process for the production of a trinuclear dyestuff characterized by the following formula:

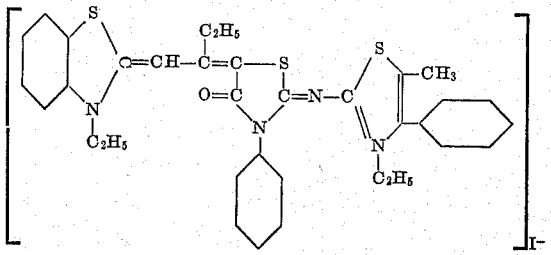

which comprises treating a thiazolone of the following formula:

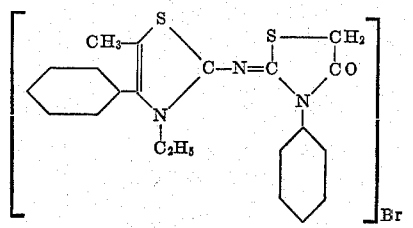

with 2-(β-ethyl-β-methylmercaptovinyl)benzothiazole ethiodide in the presence of an aliphatic alcohol and a basic condensing agent.

HENRY G. DERBYSHIRE.

No references cited.